United States Patent
Fan

(10) Patent No.: US 10,272,847 B1
(45) Date of Patent: Apr. 30, 2019

(54) FOLDABLE CLAMPING DEVICE

(71) Applicant: Eagle Fan, Chu-Pei (TW)

(72) Inventor: Eagle Fan, Chu-Pei (TW)

(*) Notice: Subject to any disclaimer, the term of this patent is extended or adjusted under 35 U.S.C. 154(b) by 0 days.

(21) Appl. No.: 16/171,651

(22) Filed: Oct. 26, 2018

(51) Int. Cl.
| | |
|---|---|
| *H04M 1/00* | (2006.01) |
| *B60R 11/02* | (2006.01) |
| *B60R 11/00* | (2006.01) |
| *H04M 1/04* | (2006.01) |

(52) U.S. Cl.
CPC ... *B60R 11/0241* (2013.01); *B60R 2011/0071* (2013.01); *H04M 1/04* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,443,237 | A * | 8/1995 | Stadtmauer | A47B 21/0314 248/118.3 |
| 8,462,103 | B1 * | 6/2013 | Moscovitch | B60R 11/02 345/1.1 |
| 9,568,148 | B2 * | 2/2017 | Carnevali | B60R 11/0241 |
| 9,843,657 | B1 * | 12/2017 | Guzek | H04B 1/3888 |
| 9,929,766 | B1 * | 3/2018 | Guzek | H04B 1/3888 |
| 2002/0170116 | A1 * | 11/2002 | Borders | A61B 6/0457 5/600 |
| 2006/0009255 | A1 * | 1/2006 | Vuolteenaho | H04M 1/0235 455/556.1 |
| 2008/0203260 | A1 * | 8/2008 | Carnevali | B60R 11/0241 248/316.5 |
| 2008/0234013 | A1 * | 9/2008 | Bury | B60R 11/0241 455/575.1 |
| 2008/0296454 | A1 * | 12/2008 | Carnevali | A47B 21/0314 248/231.71 |
| 2010/0038505 | A1 * | 2/2010 | Sonnenberg | F16M 11/041 248/226.11 |
| 2010/0222115 | A1 * | 9/2010 | Griffin | G06F 1/1624 455/575.4 |
| 2010/0273542 | A1 * | 10/2010 | Holman, IV | H04M 1/0237 455/575.4 |
| 2011/0031287 | A1 * | 2/2011 | Le Gette | F16M 11/04 224/101 |
| 2012/0318937 | A1 * | 12/2012 | Carnevali | F16M 11/041 248/122.1 |
| 2013/0084919 | A1 * | 4/2013 | Glynn | H01M 10/465 455/566 |

(Continued)

*Primary Examiner* — Md K Talukder
(74) *Attorney, Agent, or Firm* — Lin & Associates Intellectual Property, Inc.

(57) ABSTRACT

A clamping device includes a first support member, a first pivot member, a second pivot member and a second support member; the first support member including a clamping unit for clamping a mobile phone and having a pivot end connected pivotally to the first pivot member; the first pivot member including a first extension element; the second pivot member including a second extension element connected to the first extension element such that the first and second extension elements are rotatable with respect to each other about a common axis; the second support member having a pivot end connected pivotally to the second pivot member, including a stationary clamp arm, a movable L-shaped clamp arm and a biasing element for biasing the L-shaped clamp arm to contact with the stationary clamp arm to provide a clamping force therebetween.

8 Claims, 8 Drawing Sheets

(56) References Cited

U.S. PATENT DOCUMENTS

| | | | | |
|---|---|---|---|---|
| 2013/0114198 A1* | 5/2013 | Gengler | ............... | B65D 25/00 |
| | | | | 361/679.08 |
| 2013/0128465 A1* | 5/2013 | Oh | ................ | G06F 1/1624 |
| | | | | 361/726 |
| 2014/0085814 A1* | 3/2014 | Kielland | ............... | A45F 3/02 |
| | | | | 361/679.55 |
| 2014/0262850 A1* | 9/2014 | Kolton | ............... | A45C 11/00 |
| | | | | 206/38 |
| 2015/0111612 A1* | 4/2015 | Yaghmour | ........ | H04M 1/72575 |
| | | | | 455/557 |
| 2018/0146562 A1* | 5/2018 | Carnevali | ............. | F16M 13/02 |
| 2018/0192780 A1* | 7/2018 | Lowe | ............... | A47C 21/022 |

\* cited by examiner

FOLDABLE CLAMPING DEVICE

BACKGROUND OF THE INVENTION

1. Field of the Invention

The present invention relates generally to a clamping device, and more particularly to a foldable clamping device of hand-free mode for holding an electronic gadget (like a smart phone) during traveling in mass transport systems, such as mass rapid trains and planes.

2. The Prior Arts

During long-distance travels, whether it is by plane, high-speed rail or bus, which takes many hours, most travelers will not only feel tired, but may also feel very bored. Watching videos on one's mobile phone can kill time and even deal with some commercial affairs. However, if you use your mobile phone for a long time, it will cause certain damage to the cervical spine, causing pain in the cervical spine during the journey. If you change your hand to take the mobile phone to maintain the head-up state, it will cause pain in your arms, affecting the comfort of the journey. The seat structure of the general mass transport systems, like the car or the aircraft, is roughly the same and is not provided with devices for holding an indispensable gadget, like a smart phone. So it is necessary to design a set of hands-free devices that can be used in the mass transportation systems to meet the needs of users.

SUMMARY OF THE INVENTION

A primary objective of the present invention is to provide a foldable clamping device that can be fixed to a dining tray behind a seat such as in an airplane, a high-speed rail or a train, and then adjust its position by a plurality of sets of pivot members to hold the grip. The function can be adjusted to meet the user's observation angle to achieve the purpose of hand-free modes for holding an electronic device, and the overall structure of the clamping device is small and easy to install on a vehicle and can be quickly removed when desired and is convenient to carry along with the user.

A secondary objective of the present invention is to provide a foldable clamping device, which mainly utilizes the design of multiple sets of pivot members so that there are many different types of use after deployment of the clamping device to meet the needs of users. The clamping device can be folded in small size so that it does not occupy a large space in addition to easy to carry along with the user.

In order to achieve the objective mentioned above, a foldable clamping device of the present invention includes: a first support member, a first pivot member, a second pivot member and a second support member; the first support member including a clamping unit for clamping a mobile phone and having a pivot end connected pivotally to the first pivot member; the first pivot member being a T-shaped body including a middle portion formed with a first extension element; the second pivot member being a T-shaped body including a middle portion formed with a second extension element connected to the first extension element in such a manner that the first and second extension elements are rotatable with respect to each other about a common axis; the second support member having a pivot end connected pivotally to the second pivot member, including a stationary clamp arm distal from the pivot end, a movable L-shaped clamp arm extending partially into the second support member and movable away linearly away from the stationary clamp arm and a biasing element disposed interior of the second support member for biasing the L-shaped clamp arm to contact with the stationary clamp arm when no external force is applied on the biasing element; wherein, in order to keep the clamping device in a storage position, after adjusting relative position between the first and second pivot members, the first and second support members can be folded toward each other in such a manner that the clamping unit extends within a space defined by the stationary clamp arm and the pivot end of the second support member.

In one embodiment of the present invention, the clamping unit is mounted rotatably on the first support member.

In one embodiment of the present invention, the clamping unit is mounted eccentrically with respect to a center axis of the first support member. The clamping device further includes a position fixing mechanism in form meshing toothed faces for retaining a position of the clamping unit on the first support member after rotation of the first and second extension elements relative to each other.

In one embodiment of the present invention, the first support member has a front side surface for supporting the clamping unit and a rear side surface including an inclined surface portion proximate to the first pivot member to which the pivot end of the first support member is connected pivotally such that the first support member can be adjusted in order to dispose the inclined surface portion of the first support member on the first pivot member.

In one embodiment, the clamping device of the present invention further includes a position fixing mechanism in form meshing toothed faces located proximate to the pivot end of the first support member connected pivotally to the first pivot member, the pivot end of the second support member connected pivotally to the second pivot member and the common axis shared by the first and second extension elements for retaining a position of the clamping unit on the first support member after rotation of the first and second extension elements relative to each other.

In one embodiment of the present invention, the movable L-shaped clamp arm is fabricated from metals.

In one embodiment of the present invention, the second support member is formed with a guide channel and a manipulating plate disposed in the guide channel in such a manner to contact a portion of the movable L-shaped clamp arm such that manipulating the plate against biasing action of the biasing element results in simultaneously moving the L-shaped clamp arm away from the stationary clamp arm.

In one embodiment of the present invention, the stationary clamp arm has two lateral sides, each of which is formed with a notch via which the movable L-shaped clamp arm can be manually pushed away from the stationary clamp arm in order to provide a clamping force between the clamping arms upon release of the manual push action.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
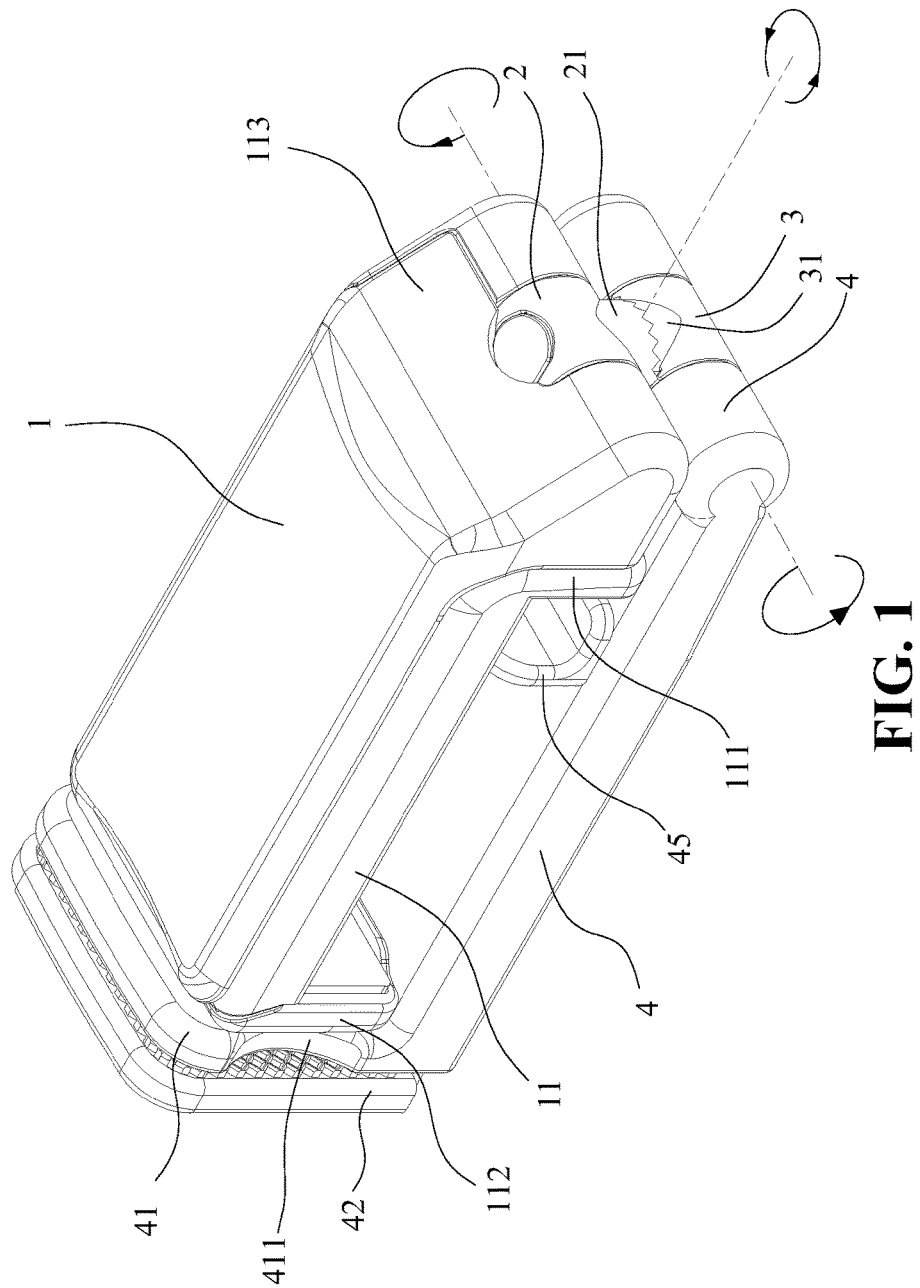
FIG. 1 is a perspective view of a foldable clamping device of the present invention in a storage position.
Figure 2:
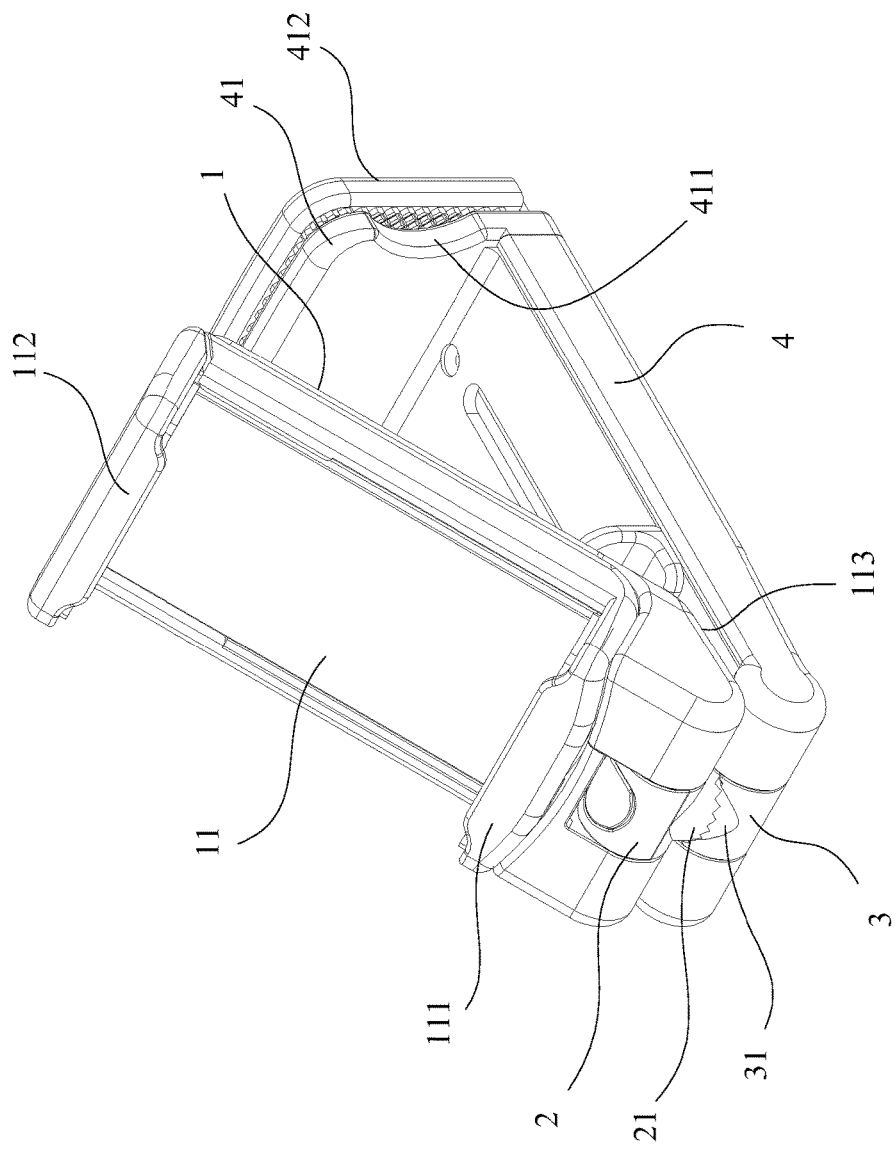
FIG. 2 is a perspective view of the foldable clamping device of the present invention in a first unfolded state.
Figure 3:
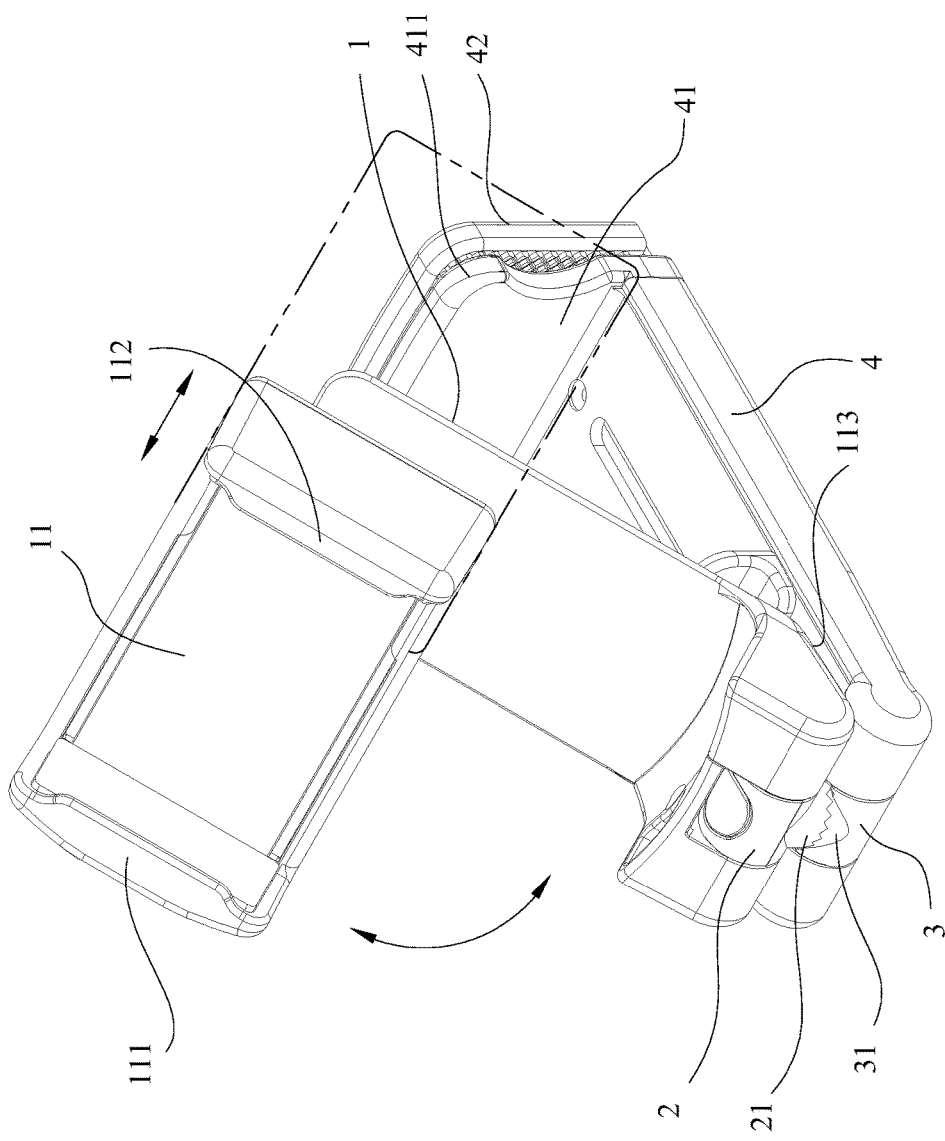
FIG. 3 is a perspective view of the foldable clamping device of the present invention in a second unfolded state.

Referring to FIGS. 1 and 3, wherein FIG. 1 is a perspective view of a foldable clamping device of the present invention in a storage position; FIG. 2 is a perspective view of the foldable clamping device of the present invention in a first unfolded state; and FIG. 3 is a perspective view of the foldable clamping device of the present invention in a second unfolded state. As shown, the clamping device of the present invention includes: a first support member 1, a first pivot member 2, a second pivot member 3 and a second support member 4. The first support member 1 includes a clamping unit 11 for clamping a mobile phone, has a pivot end connected pivotally to the first pivot member 2. The first pivot member 2 is a T-shaped body, includes a middle portion formed with a first extension element 21. The second pivot member 3 is a T-shaped body, includes a middle portion formed with a second extension element 31 connected to the first extension element 21 in such a manner that the first and second extension elements 21, 31 are rotatable relative to each other about a common axis. The second support member 4 has a pivot end connected pivotally to the second pivot member 3, includes a stationary clamp arm 41 distal from the pivot end, a movable L-shaped clamp arm 42 extending partially into the second support member 4 and a biasing element 43 (see FIG. 4) disposed interior of the second support member 4 for the biasing the L-shaped clamp arm 42 to contact with the stationary clamp arm 41 when no external force is applied on the biasing element 43. After assembly of the clamping device of the present invention and when the clamping device of the present invention is in use, relative position between the first and second pivot members 2, 3 can adjusted in different angles in order to dispose the first and second support members 1, 4 at different modes to clamp a mobile phone so as to satisfy the needs of the users. Alternately, when not in use and in order to keep the clamping device of the present invention a storage position, after adjusting relative position between the first and second pivot members 2, 3, the first and second support members 1, 4 can be folded toward each other in such a manner that the clamping unit 11 extends within a space defined by the stationary clamp arm 41 and the pivot end of the second support member 4.

FIG. 2 is a perspective view of the foldable clamping device of the present invention in a first unfolded state, in which a mobile phone (not visible) can disposed on the first support member 1 in order to be clamped by the clamping unit 11. The clamping unit 11 preferably includes a first clamp element 111, a second clamp element 112 movable linearly toward and away from the first clamp element 11 and spring means are provided to create a clamping force between the first and second clamp elements 111, 112. In this embodiment, a single moving mode is employed to move the first and second clamp elements 111, 112. Bilateral moving mode is also an option. FIG. 3 is a perspective view of the foldable clamping device of the present invention in a second unfolded state, in which a mobile phone (not visible) can be disposed on the first support member 1 in order to be clamped by the clamping unit 11. Preferably, the clamping unit 11 is mounted rotatably on the first support member 1. More preferably, the clamping unit 11 is mounted eccentrically with respect to a center axis of the first support member 1. In FIG. 3, the clamping unit 11 is mounted eccentrically on the first support member 1 adjacent to the second clamp element 112 in order to clamp a mobile phone of larger size such that the weight of larger mobile phone is concentrated on the second support member 4 (see FIG. 6). In another embodiment, the first support member 1 has a front side surface for supporting the clamping unit 11 and a rear side surface including an inclined surface portion 113 proximate to the first pivot member 2 to which the pivot end of the first support member 1 is connected pivotally such that the first support member 1 can be adjusted in order to dispose the inclined surface portion 113 of the first support member 1 on the first pivot member 2 (see FIGS. 2 and 3).

The first pivot member 2 is a T-shaped body, includes a middle portion formed with a first extension element 21. The second pivot member 3 is a T-shaped body, includes a middle portion formed with a second extension element 31 connected to the first extension element 21 in such a manner that the first and second extension elements 21, 31 are rotatable relative to each other about a common axis in such a manner that the first support member 1 can be disposed on the first pivot member 2 at a particular position or angle due to 360 degree rotation of the first and second pivot members 2, 3 relative to each other.

Figure 4:
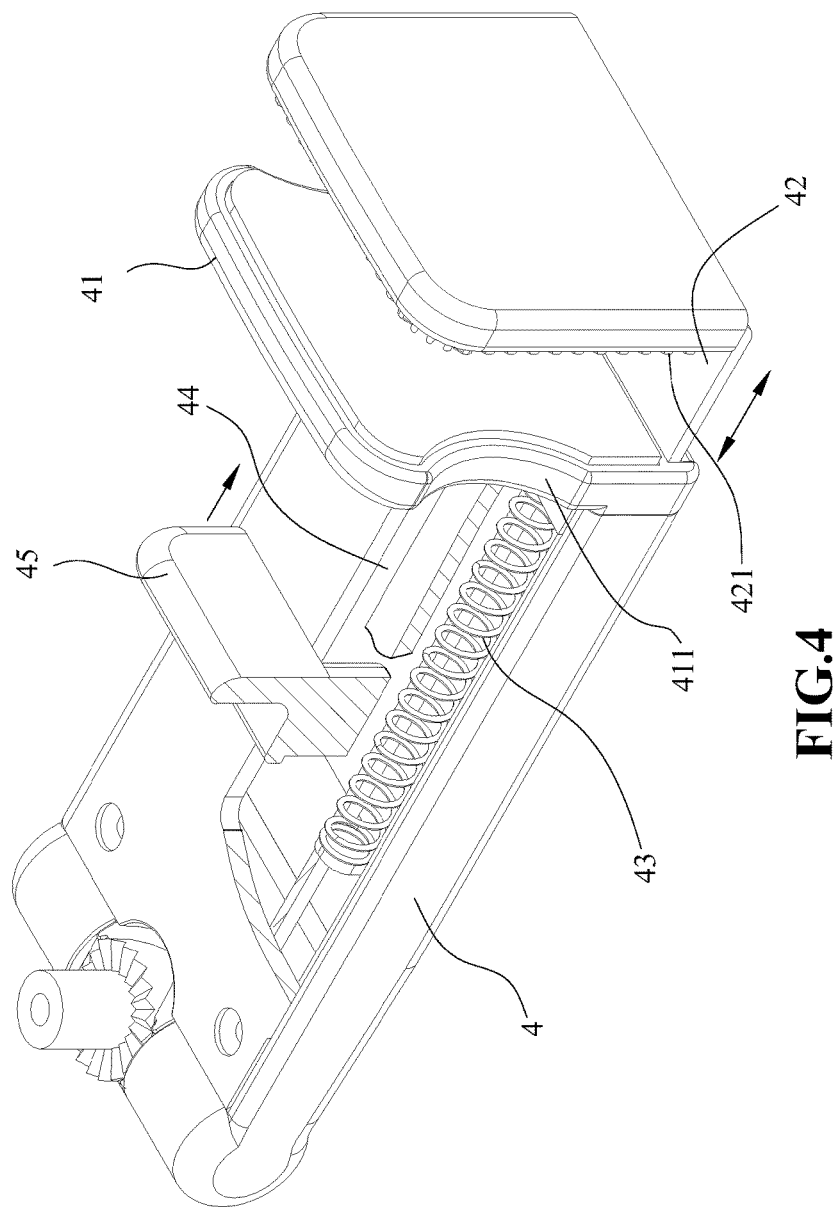
FIG. 4 is a second support member employed in the clamping device of the present invention, illustrating an interior thereof.

As best shown in FIG. 4, the second support member 4 includes a stationary clamp arm 41 distal from the pivot end, a movable L-shaped clamp arm 42 extending partially into the second support member 4 and a biasing element 43 disposed interior of the second support member 4 for the biasing the L-shaped clamp arm 42 to contact with the stationary clamp arm 41 when no external force is applied on the biasing element 43. In this embodiment, a pair of springs serve the purpose of the biasing element. The movable L-shaped clamp arm 42 is fabricated from metals. Preferably, a soft rubber pad 421 is attached on an inner side of the L-shaped clamp arm 42 in order to provide additional friction force together with the stationary clamp arm 41 in the event the clamping device of the present invention is used clamp a dining tray at the back of a seat (see FIGS. 7 and 8).

In order to operate the clamping device of the present invention, the second support member 4 is formed with a guide channel 44 and a manipulating plate 45 disposed in the guide channel 44 in such a manner to contact a portion of the movable L-shaped clamp arm 42 and a portion of the plate 45 exposed vertically from the guide channel 44 such that manipulating the plate 45 against biasing action of the biasing element 43 results in simultaneously moving the L-shaped clamp arm 42 away from the stationary clamp arm 41, thereby providing a clamping force between the stationary clamp arm 41 and the L-shaped clamp arm 42 upon removal of the manipulating power. Preferably, the stationary clamp arm 41 has two lateral sides, each of which is formed with a notch 411 via which the soft rubber pad 421 on the movable L-shaped clamp arm 42 can be manually pushed away from the stationary clamp arm 41 in order to provide the clamping force between the clamping arms 41, 42 upon release of the manual push power.

Figure 5:
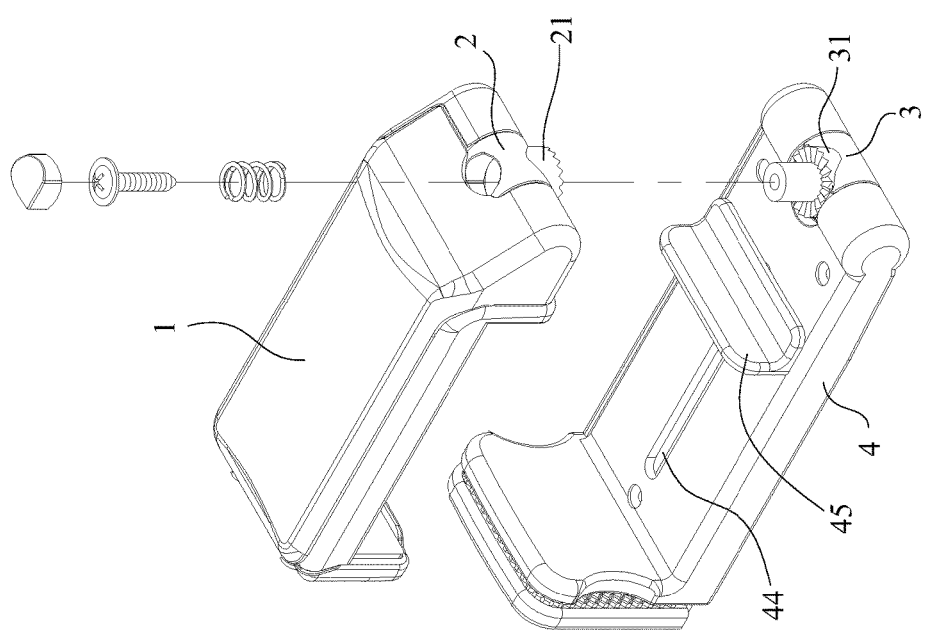
FIG. 5 shows first and second extension elements of first and second pivot members employed in the clamping device of the present invention.

The clamping device of the present invention further includes a position fixing mechanism in form meshing toothed faces (see FIG. 5) located proximate to the pivot end of the first support member 1 connected pivotally to the first pivot member 2, the pivot end of the second support member 4 connected pivotally to the second pivot member 3 and the common axis shared by the first and second extension elements 21, 31 for retaining a relative position of the first support member 1 on the first pivot member 2 after rotation of the first extension element 21 relative to the second extension element 31. In addition to the meshing toothed faces, other position fixing means can be employed so long as they can retain the adjusted position between the first and second extension elements 21,31.

Figure 6:
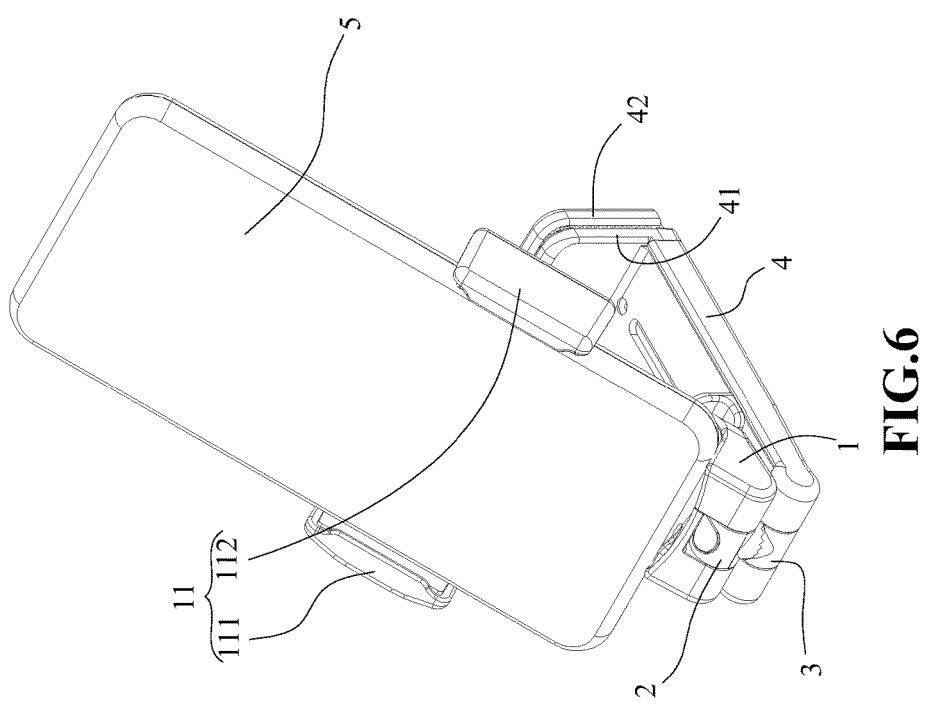
FIG. 6 illustrates the foldable clamping device of the present invention in the second unfolded state holding a mobile phone thereon.

Referring to FIG. 6, before the stationary clamp arm 41 and the movable L-shaped clamp arm 42 of the second support member 4 are used for clamping an object, like a dining tray, the second support member 4 can be disposed on a table for serving as a support platform owing to the weight of the L-shaped clamp arm 42 fabricated from metal. At this time, relative position between the first and second pivot members 2, 3 can be adjusted in such a manner that the inclined surface portion 113 of the first support member 1 seated on the second support member 4, where a mobile phone 5 can be disposed so as to be clamped by the first clamp element 111 and the second clamp element 112 of the clamping unit 11. In other words, the mobile phone 5 is disposed on the table via the clamping device of the present invention in a hand-free mode. Alternatively, if the user wishes the mobile phone to be disposed transversely different from that shown in FIG. 6, he can simply rotate the clamping unit 11 so as to dispose the same as shown in FIG. 2, wherein the mobile phone 5 may provide a wide screen when mounted transversely on the clamping unit 11.

Figure 7:
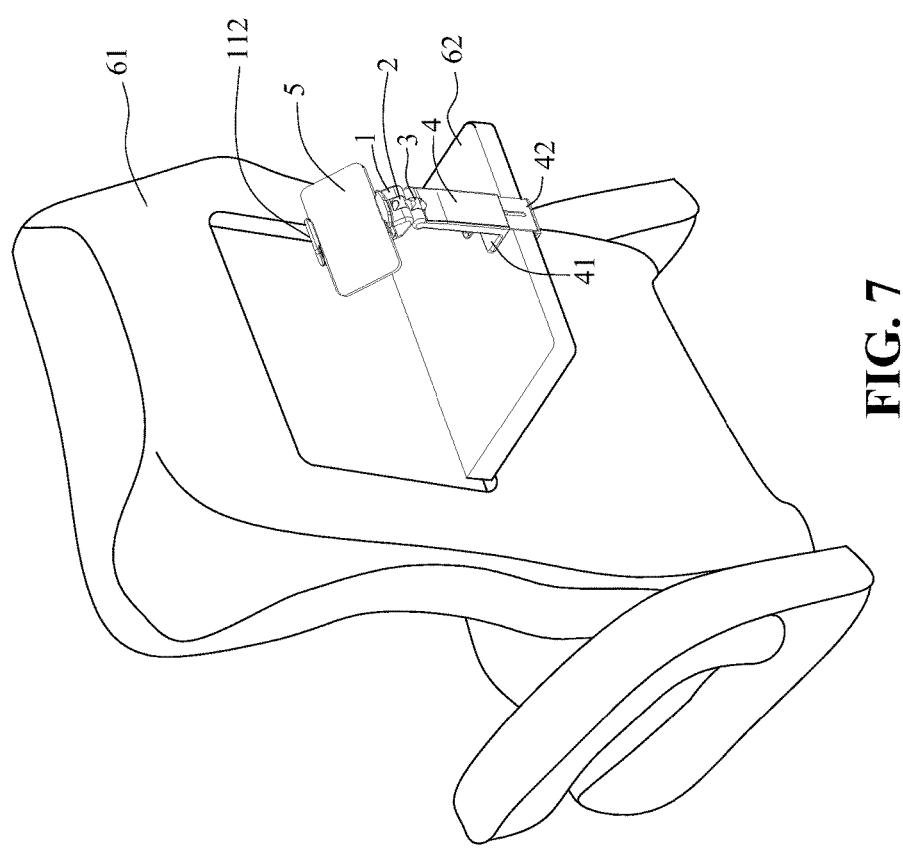
FIG. 7 illustrates the foldable clamping device of the present invention attached to a dining tray of a seat for holding a mobile phone thereon.
Figure 8:
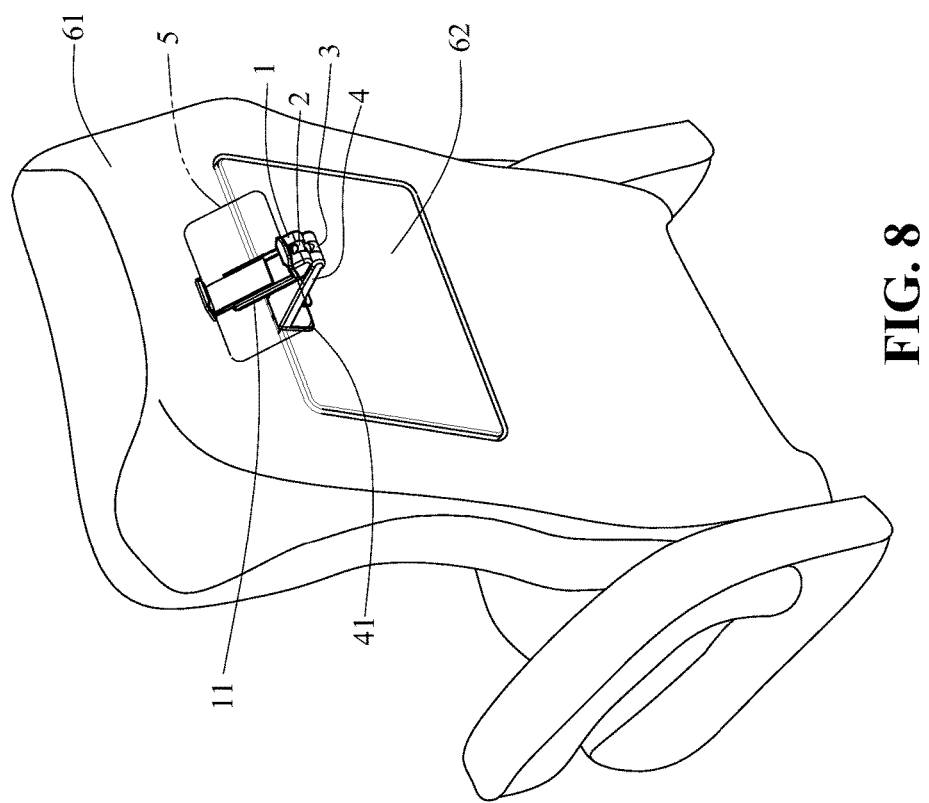
FIG. 8 illustrates the foldable clamping device of the present invention attached to a dining tray of a seat for holding a mobile phone in another way.

Since the clamping device of the present invention is intended to be used at the back of a seat 61 in mass transport systems, like an air plane or train, in hand-free mode, as best shown in FIGS. 7 and 8. For instance, a dining tray 62 is provided at the back of the seat 61 in such a manner that the dining tray 62 can be unfolded for use as best shown in FIG. 7, wherein the user can manually push the L-shaped clamp plate 42 away from the stationary clamp plate 41 in order to clamp the edge of the dining tray 62 between the clamp plates 41, 42 upon release of the push power. After adjusting relative position between the first and second pivot members 2, 3, the inclined surface portion 113 of the first support member 1 is seated on the second support member 4, where a mobile phone 5 can be disposed so as to be clamped by the first clamp element 111 and the second clamp element 112 of the clamping unit 11. In other words, the mobile phone 5 is disposed on the dining tray 62 via the clamping device of the present invention in a hand-free mode so that the user can operate the mobile phone 5.

In the event, the dining tray 62 is folded on the seat 61, as best shown in FIG. 8. If the traveling person wishes to use the mobile phone in a hand-free mode, he is to attach the clamping device of the present invention to the dining tray 61 in the above described manner, after which the dining tray 62 can be folded on the seat 1 in such a manner that the L-shaped clamp arm 42 extends outwardly from a gap between the dining tray 62 and the seat 61. After adjusting relative position between the first and second pivot members 2, 3, the inclined surface portion 113 of the first support member 1 is seated on the second support member 4, where a mobile phone 5 can be disposed so as to be clamped by the first clamp element 111 and the second clamp element 112 of the clamping unit 11 different from that shown in FIG. 7. In other words, the mobile phone 5 is disposed on the dining tray 62 via the clamping device of the present invention in a hand-free mode so that the user can operate the mobile phone 5.

Although the present invention has been described with reference to the preferred embodiments thereof, it is apparent to those skilled in the art that a variety of modifications and changes may be made without departing from the scope of the present invention, which is intended to be defined by the appended claims.

What is claimed is:

1. A clamping device comprising:
   a first support member, a first pivot member, a second pivot member and a second support member;
   said first support member including a clamping unit for clamping a mobile phone, and having a pivot end connected pivotally to said first pivot member;
   said first pivot member being a T-shaped body including a middle portion formed with a first extension element;
   said second pivot member being a T-shaped body including a middle portion formed with a second extension element connected pivotally to said first extension element in such a manner that said first and second extension elements are rotatable with respect to each other about a common axis; and
   said second support member having a pivot end connected pivotally to said second pivot member, including a stationary clamp arm distal from said pivot end, a movable L-shaped clamp arm extending partially into said second support member and movable away linearly away from said stationary clamp arm and a biasing element disposed interior of said second support member for said biasing said L-shaped clamp arm to contact with said stationary clamp arm when no external force is applied on said biasing element;
   wherein, in order to keep the clamping device in a storage position, after adjusting relative position between said first and second pivot members, said first and second support members can be folded toward each other in such a manner that said clamping unit extends within a space defined by said stationary clamp arm and said pivot end of said second support member.

2. The clamping device according to claim 1, wherein said clamping unit is mounted rotatably on said first support member.

3. The clamping device according to claim 2, wherein said clamping unit is mounted eccentrically with respect to a center axis of said first support member, the clamping device further comprising a position fixing mechanism in form meshing toothed faces for retaining a position of said clamping unit on said first support member after rotation of the former relative to the latter.

4. The clamping device according to claim 1, wherein said first support member has a front side surface for supporting said clamping unit and a rear side surface including an inclined surface portion proximate to said first pivot member to which said pivot end of said first support member is connected pivotally such that said first support member can be adjusted in order to dispose said inclined surface portion of said first support member on said first pivot member.

5. The clamping device according to claim 1, further comprising a position fixing mechanism in form meshing toothed faces located proximate to said pivot end of said first support member connected pivotally to said first pivot member, said pivot end of said second support member connected pivotally to said second pivot member and said common axis shared by said first and second extension elements for retaining a position of said clamping unit on said first support member after rotation of the former relative to the latter.

6. The clamping device according to claim 1, wherein said movable L-shaped clamp arm is fabricated from metals.

7. The clamping device according to claim 1, wherein said second support member is formed with a guide channel and a manipulating plate disposed in said guide channel in such a manner to contact a portion of said movable L-shaped clamp arm such that manipulating said plate against biasing action of said biasing element results in simultaneously moving said L-shaped clamp arm away from said stationary clamp arm.

8. The clamping device according to claim 1, wherein said stationary clamp arm has two lateral sides, each of which is formed with a notch via which said movable L-shaped clamp arm can be manually pushed away from said stationary clamp arm in order to provide said clamping force between said clamping arms upon release of said manual push action.

* * * * *